(12) United States Patent
Cromer et al.

(10) Patent No.: US 7,155,605 B1
(45) Date of Patent: Dec. 26, 2006

(54) DATA PROCESSING SYSTEM AND METHOD FOR MAINTAINING SECURE DATA BLOCKS

(75) Inventors: Daryl Carvis Cromer, Cary, NC (US); Howard Locker, Cary, NC (US); Andy Lloyd Trotter, Raleigh, NC (US); James Peter Ward, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 723 days.

(21) Appl. No.: 09/281,852

(22) Filed: Mar. 31, 1999

(51) Int. Cl.
*H04K 9/00* (2006.01)

(52) U.S. Cl. .................. 713/151; 713/165; 707/9

(58) Field of Classification Search ............ 713/151, 713/200, 201, 165, 167; 709/203, 225, 229; 380/277, 255; 707/9–10; 726/3
See application file for complete search history.

(56) References Cited

U.S. PATENT DOCUMENTS

| | | | | |
|---|---|---|---|---|
| 4,864,616 A | * | 9/1989 | Pond et al. ............... | 380/25 |
| 5,689,565 A | * | 11/1997 | Spies et al. .............. | 380/25 |
| 5,963,915 A | * | 10/1999 | Kirsch .................... | 705/26 |
| 6,006,333 A | * | 12/1999 | Nielsen .................. | 713/202 |
| 6,170,017 B1 | * | 1/2001 | Dias et al. ............... | 709/235 |
| 6,182,142 B1 | * | 1/2001 | Win et al. ............... | 709/229 |
| 6,317,829 B1 | * | 11/2001 | Van Oorschot ............ | 713/155 |
| 6,327,608 B1 | * | 12/2001 | Dillingham .............. | 709/203 |
| 6,339,423 B1 | * | 1/2002 | Sampson et al. .......... | 709/219 |
| 6,374,359 B1 | * | 4/2002 | Shrader et al. ........... | 713/201 |
| 6,421,729 B1 | * | 7/2002 | Paltenghe et al. ......... | 709/229 |
| 6,460,141 B1 | * | 10/2002 | Olden .................... | 713/201 |

OTHER PUBLICATIONS

Bruce Schneier, Applied Cryptography, 1996, second edition, p. 216.*
Terminology Reference System, Version 2003, updated Mar. 26, 2004: Data processing system.*
Wikipedia, The Free encyclopedia, updated May 10, 2004.*

* cited by examiner

*Primary Examiner*—Kim Vu
*Assistant Examiner*—T. B. Truong
(74) *Attorney, Agent, or Firm*—Carlos Munoz-Bustamante; Dillon & Yudell LLP

(57) ABSTRACT

A data processing system and method are disclosed for maintaining a secure data block within the system. A block of data is established within the system. The block of data is associated with a particular user and a particular application. A hardware master key pair is established for the system. The hardware master key pair includes a master private key and a master public key. The hardware master key pair is associated with the system for which it was established so that the master private key is known to only that system. The block of data is encrypted utilizing the master public key. The master private key is required to decrypt the encrypted block of data. This data processing system is the only system capable of decrypting the encrypted block of data.

14 Claims, 3 Drawing Sheets

DATA PROCESSING SYSTEM AND METHOD FOR MAINTAINING SECURE DATA BLOCKS

BACKGROUND OF THE INVENTION

1. Field of the Invention

The present invention relates in general to data processing systems and, in particular, to a data processing system and method for maintaining secure blocks of data within the system. Still more particularly, the present invention relates to a data processing system and method for maintaining secure blocks of data within the system by encrypting the blocks of data utilizing a hardware master key pair.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

Encryption algorithms are known to ensure that only the intended recipient of a message can read and access the message. One known encryption algorithm is an asymmetric, or public key, algorithm. The public key algorithm is a method for encrypting messages sent from a first computer system to a second computer system. This algorithm provides for a key pair including a public key and a private key for each participant in a secure communication. This key pair is unique to each participant. An example of such an encryption scheme is an RSA key pair system.

With the proliferation of Internet services, a need has arisen to identify and authenticate the remote users. For example, an Internet electronic mail service requires a user's name and password prior to permitting access to the user's account. Many other Internet services also require a user's name and password prior to permitting access.

In order to provide more efficient access to these services, an Internet service may provide a block of data, commonly called a "cookie", to a client computer system which includes information typically needed by the service. The cookie includes information associated with both a particular user and the service which provided the cookie. The cookie often includes the associated user's name, and password, and may include the user's credit card information, address, preferences for using the service, and other data. Therefore, a cookie stores information associated with a particular user for a particular service.

A single user may have many cookies stored on the user's computer. The cookies are not secure. An unauthorized user could copy a user's cookies to another computer system, and thereby gain access to the valuable information stored within the cookies.

Therefore a need exists for a data processing system and method for maintaining secure data blocks.

SUMMARY OF THE INVENTION

A data processing system and method are disclosed for maintaining a secure data block within the system. A block of data is established within the system. The block of data is associated with a particular user and a particular application. A hardware master key pair is established for the system. The hardware master key pair includes a master private key and a master public key. The hardware master key pair is associated with the system for which it was established so that the master private key is known to only that system. The block of data is encrypted utilizing the master public key. The master private key is required to decrypt the encrypted block of data. This data processing system is the only system capable of decrypting the encrypted block of data.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–4 of the drawings, like numerals being used for like and corresponding parts of the accompanying drawings.

The present invention is a method and system for maintaining a secure data block within the system. A block of data is established within the system and is associated with a particular user and a particular application. The block of data includes information regarding the associated user and application. For example, the data block may include a user's name, password, and credit card number.

A hardware master key pair is established for the system. The hardware master key pair includes a master private key and a master public key. The hardware master key pair is associated with the system so that the master private key is known to only the data processing system for which it was established.

The data block is encrypted utilizing the master public key. The encrypted data block is stored in non-protected storage. The master private key is required to decrypt the encrypted block of data. Only this data processing system is capable of decrypting the encrypted block of data. If the encrypted data block is copied to another data processing system, the data will be protected because the other data processing system will not have the first system's master private key, and will not be able to decrypt the encrypted data block.

When the data block is needed, such as by a browser program in order to access the associated application, the decrypted data block is requested from the encryption device. The encrypted data block is then decrypted by the encryption device utilizing the hardware private key, which is stored in the encryption device.

Figure 1:
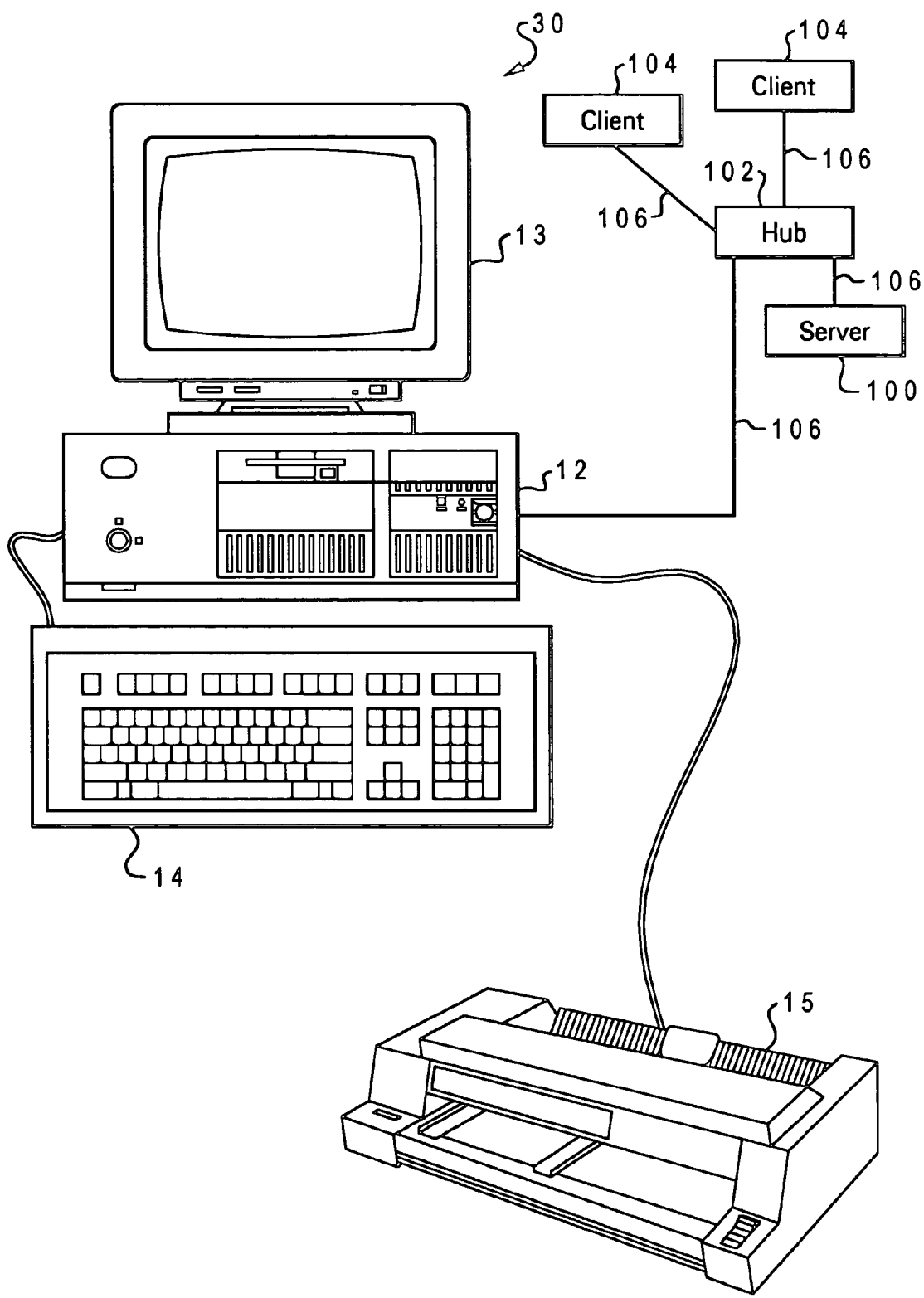
FIG. 1 illustrates a pictorial representation of a data processing system in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Each client computer system 104 and server computer system 100 may be implemented utilizing a computer system 30. Server computer system 100 and client computer systems 104 are connected to hub 102 utilizing a communication link 106. Communications link 106 may conform to a local area network standard such as the Ethernet specification, or may be a wide area network (WAN) utilizing a telephone network. Those skilled in the art will recognize that the invention described herein may be implemented utilizing any suitable type of data communications channel or link. In addition, communications link 106 may simultaneously include multiple different types of data communications channels.

Computer system 30 includes a computer 12, a monitor 13, a keyboard 14, and a printer or plotter 15. Computer system 30 may be implemented utilizing any commercially available computer system which has been suitably programmed and which has been modified as described below.

Figure 2:
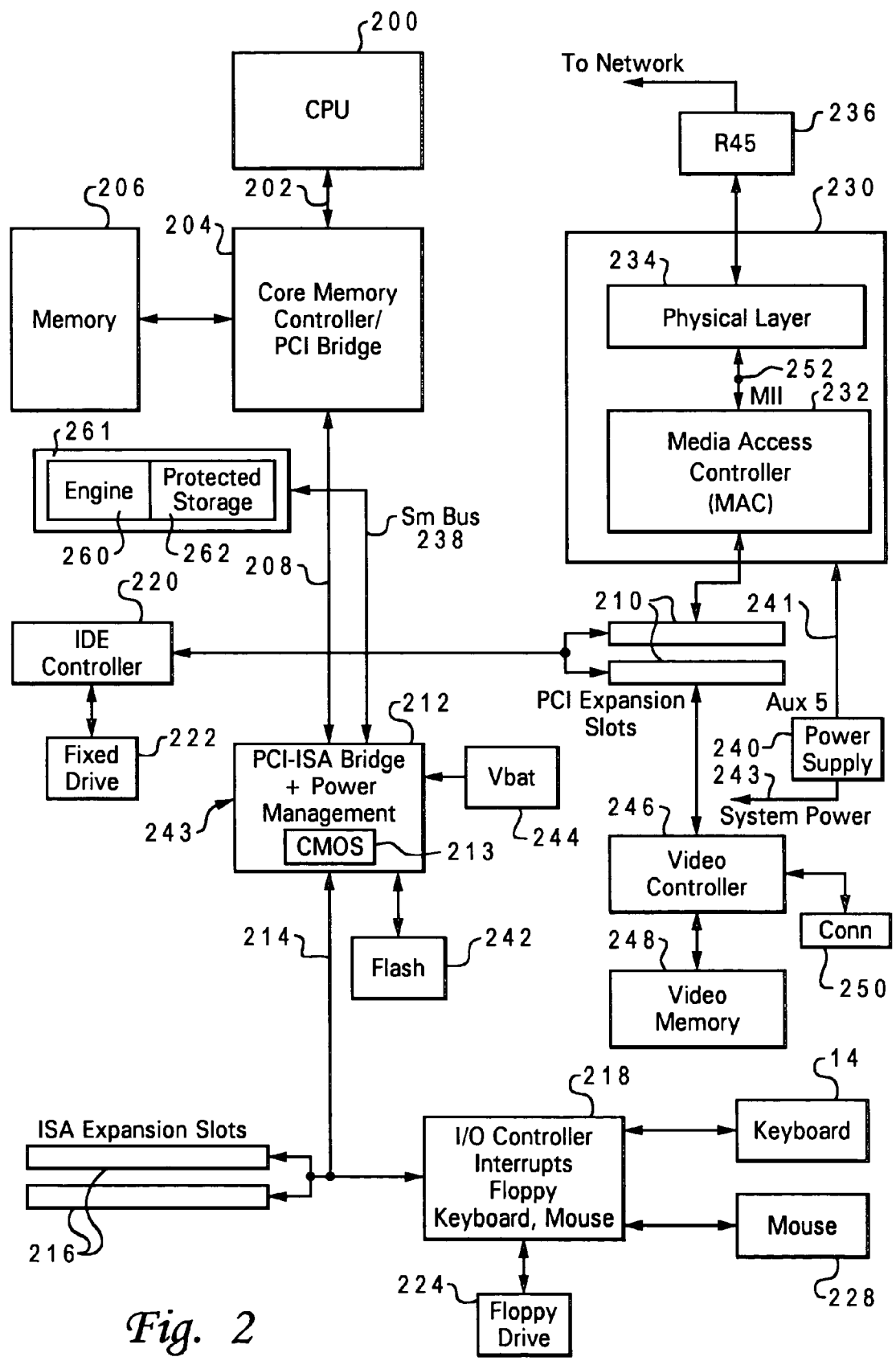
FIG. 2 depicts a more detailed pictorial representation of the data processing system of FIG. 1 in accordance with the method and system of the present invention.

FIG. 2 depicts a more detailed pictorial representation of the data processing system of FIG. 1 in accordance with the method and system of the present invention. Computer 12 includes a planar (also commonly called a motherboard or system board) which is mounted within computer 12 and provides a means for mounting and electrically interconnecting various components of computer 12 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 204 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 14, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 12 includes a video controller 246 which may, for example, be plugged into one of PCI expansion slots 210. Video controller 246 is connected to video memory 248. The image in video memory 248 is read by controller 246 and displayed on monitor 13 which is connected to computer 12 through connector 250.

Computer system 12 includes a power supply 240 which supplies full normal system power 243, and has an auxiliary power main AUX 5 241 which supplies full time power to the power management logic 212, and to a network adapter 230.

Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit computer system 30 to communicating with server 100 utilizing communications link 106.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of computer system 30. Second, it advertises its own capabilities to server computer 100. Third, it establishes a connection with server computer 100 using the highest performance connection technology.

In accordance with the present invention, the planar includes an encryption device 261 which includes an encryption/decryption engine 260 which includes an encryption/decryption algorithm which is utilized to encode and decode messages transmitted and received by the planar, and protected storage 262. Engine 260 can preferably perform public\private key encryption. Engine 260 may access a protected storage device 262. Protected storage device 262 is accessible only through engine 260, and is a one-time writable device. Therefore, storage device 262 cannot be read or written to by the planar or any other device after the keys have programmed by system manufacturing or the system owner. Hardware master keys stored within storage 262 are protected by engine 260 and are not accessible to the planar or its components. Storage device 262 is utilized to store the hardware master key pair, including the master private key and master public key. Device 262 may be implemented utilizing an electronically erasable storage device, such as an EEPROM. Access may be gained to non-readable storage device 262 in order to initially store the master private key. However, after the master private key is stored, it cannot be read. The keys stored in EEPROM 262 may not be read by any component of the planar other than engine 260.

Encryption device 261, including engine 260 and EEPROM 262, is coupled to PCI-ISA bridge 212 utilizing a system management (SM) bus 238. System management bus 238 is a two-wire, low speed, serial bus used to interconnect management and monitoring devices. Those skilled in the art will recognize that encryption device 261 may be coupled to another bus within the planar.

Figure 3:
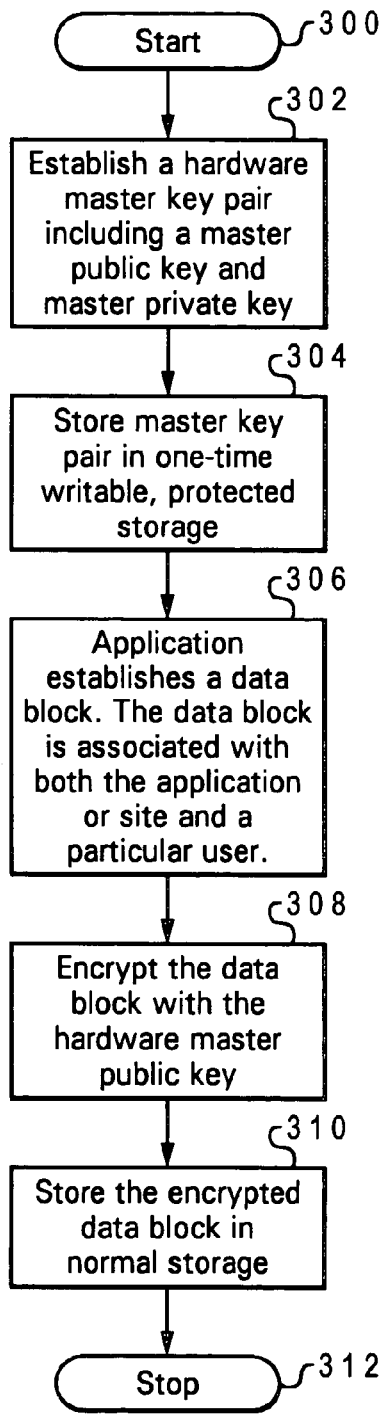
FIG. 3 illustrates a high level flow chart which depicts establishing and storing a secure data block utilizing a hardware master key pair in a data processing system in accordance with the method and system of the present invention.

FIG. 3 illustrates a high level flow chart which depicts establishing and storing a secure data block utilizing a hardware master key pair in a data processing system in accordance with the method and system of the present invention. The process starts as depicted at block 300 and thereafter passes to block 302 which illustrates establishing a hardware master key pair for data processing system 30. Next, block 304 depicts the storage of the master public key and master private key in protected storage 262 which is a one-time writable, protected storage in the encryption device. The process then passes to block 306 which illustrates an application executing on server computer system 100 establishing a data block which includes valuable information. The data block is associated both with a particular user and the application.

Next, block 308 depicts the encryption of the data block, including the valuable information, with the hardware master public key. Thereafter, block 310 illustrates the storage of the encrypted data block in storage within computer system 30 such as hard drive 222. The process then terminates as illustrated at block 312.

Figure 4:
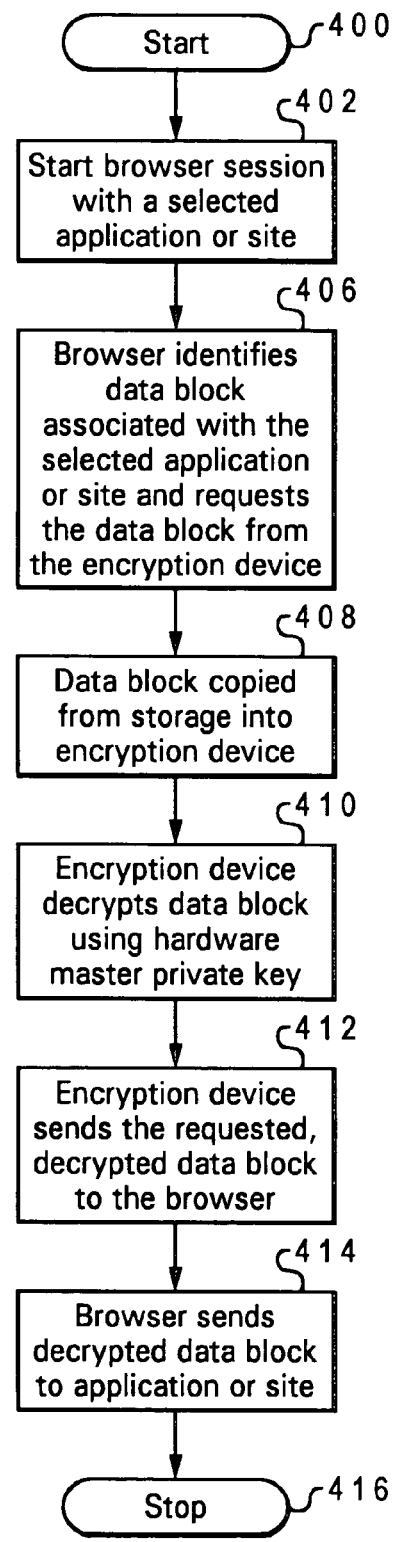
FIG. 4 depicts a high level flow chart which illustrates utilizing an encrypted data block to access an application associated with the data block in accordance with the method and system of the present invention.

FIG. 4 depicts a high level flow chart which illustrates utilizing an encrypted data block to access an application associated with the data block in accordance with the method and system of the present invention. The process starts as illustrated at block 400 and thereafter passes to block 402 which depicts a browser initiating a session with an application or site. Thereafter, block 406 depicts the browser identifying the data block associated with the user and the selected application, and requesting the data block from the encryption device.

Next, block 408 illustrates the identified, encrypted data block being copied from storage into the encryption device. Thereafter, block 410 depicts the encryption device decrypting the data block utilizing the hardware private key. The process then passes to block 412 which illustrates the encryption device sending the decrypted data block to the browser. Next, block 414 depicts the browser sending the decrypted data block or components of the decrypted data block to the application. The process then terminates as illustrated at block 416.

While a preferred embodiment has been particularly shown and described, it will be understood by those skilled in the art that various changes in form and detail may be made therein without departing from the spirit and scope of the present invention.

The invention claimed is:

1. A method for protecting the security of a cookie stored within a data processing system, said method comprising:
   storing a encryption key pair having a private key and a public key in a protected storage device within said data processing system;
   in response to the receipt of a cookie generated by an application from a remote server, encrypting said cookie with said public key;
   storing said encrypted cookie in a non-protected storage device within said data processing system;
   in response to an access request for said encrypted cookie by a browser program executing within said data processing system, decrypting said encrypted cookie with said private key; and
   sending said decrypted cookie to said browser program.

2. The method according to claim 1, wherein said non-protected storage device is a hard drive.

3. The method according to claim 1, further comprising providing an encryption device having an encryption engine and said protected storage device accessible only through said encryption engine.

4. The method according to claim 3, wherein said encrypting further include encrypting said cookie utilizing said encryption device.

5. The method according to claim 4, wherein said decrypting further includes decrypting said encrypted cookie utilizing said encryption device.

6. The method according to claim 5, wherein said sending further includes transmitting said decrypted cookie from said encryption device to said browser program.

7. The method according to claim 6, further comprising transmitting said decrypted cookie from said browser program to an application executing in a remote server.

8. A data processing system capable of protecting the security of a cookie stored within said data processing system, said data processing comprising:
   a protected storage device for storing a encryption key pair having a private key and a public key in a protected storage device within said data processing system;
   means for utilizing said public key to encrypt said cookie, in response to the receipt of a cookie generated by an application from a remote server;
   a non-protected storage device within said data processing system for storing encrypted cookie;
   means for utilizing said private key to decrypt said encrypted cookie, in response to an access request for said encrypted cookie by a browser program executing within said data processing system; and
   means for sending said decrypted cookie to said browser program.

9. The data processing system according to claim 8, wherein said non-protected storage device is a hard drive.

10. The data processing system according to claim 8, further comprising an encryption device having an encryption engine and said protected storage device accessible only through said encryption engine.

11. The data processing system according to claim 10, wherein said means for utilizing said public key to encrypt said cookie is said encryption engine.

12. The data processing system according to claim 11, wherein said means for utilizing said private key to decrypt said encrypted cookie is said encryption device.

13. The data processing system according to claim 12, wherein said sending means further includes means for transmitting said decrypted cookie from said encryption device to said browser program.

14. The data processing system according to claim 13, further comprising means for transmitting said decrypted cookie from said browser program to an application executing in a remote server.

* * * * *